(12) United States Patent
Huijsing

(10) Patent No.: US 12,103,687 B2
(45) Date of Patent: Oct. 1, 2024

(54) AIRCRAFT APPLIANCE FILTER SYSTEM

(71) Applicant: B/E AEROSPACE, INC., Winston Salem, NC (US)

(72) Inventor: Hans Huijsing, Ijsselstein (NL)

(73) Assignee: B/E AEROSPACE, INC., Winston Salem, NC (US)

( * ) Notice: Subject to any disclaimer, the term of this patent is extended or adjusted under 35 U.S.C. 154(b) by 787 days.

(21) Appl. No.: 17/148,510

(22) Filed: Jan. 13, 2021

(65) Prior Publication Data
US 2022/0219823 A1 Jul. 14, 2022

(51) Int. Cl.
*B64D 11/04* (2006.01)
*F24C 15/20* (2006.01)
*F24C 15/30* (2006.01)

(52) U.S. Cl.
CPC .......... *B64D 11/04* (2013.01); *F24C 15/2035* (2013.01); *F24C 15/30* (2013.01); *F25D 2323/0024* (2013.01)

(58) Field of Classification Search
CPC ....... B64D 11/04; F25D 23/12; F25D 17/042; F25D 17/06; F25D 2323/0024; F25D 29/005; F24C 15/2035; F24C 15/2007
See application file for complete search history.

(56) References Cited

U.S. PATENT DOCUMENTS

| | | | |
|---|---|---|---|
| 4,283,209 A | 8/1981 | Schmalhofer | |
| 9,134,036 B2* | 9/2015 | Bagwell | F24C 15/2007 |
| 2013/0036755 A1* | 2/2013 | Kang | B01L 1/50 |
| | | | 62/426 |
| 2013/0149947 A1* | 6/2013 | Bagwell | F24C 15/2007 |
| | | | 454/49 |
| 2018/0016014 A1* | 1/2018 | Burd | B21D 53/92 |
| 2020/0386415 A1* | 12/2020 | Yang | F24C 15/2035 |
| 2021/0063050 A1* | 3/2021 | Yun | B01D 46/10 |
| 2022/0200136 A1* | 6/2022 | Huijsing | B64D 11/0015 |
| 2022/0268450 A1* | 8/2022 | Appel | F24C 15/2007 |

FOREIGN PATENT DOCUMENTS

| | | |
|---|---|---|
| CH | 630240 A5 | 6/1982 |
| CN | 207050040 U | 2/2018 |
| DE | 2347586 A1 * | 4/1975 |
| DE | 102005019957 | 11/2006 |
| DE | 202019100108 | 4/2020 |
| FR | 2123751 | 9/1972 |
| KR | 100782706 B1 * | 12/2007 |
| WO | 2011058075 A2 | 5/2011 |
| WO | 2017029037 | 2/2017 |
| WO | 2019151608 | 8/2019 |

OTHER PUBLICATIONS

Extended European Search Report issued in Application No. 22150990.4 dated Jun. 10, 2022.
European Patent Office, European Office Action dated Apr. 16, 2024 in Application No. 22150990.4.

* cited by examiner

*Primary Examiner* — Ko-Wei Lin
(74) *Attorney, Agent, or Firm* — SNELL & WILMER L.L.P.

(57) ABSTRACT

An appliance comprising a door configured to enclose a cooking or chilling space, a filter slot positioned above the door configured to accept a filter for filtering odors and particles, and a control panel for controlling the appliance positioned above the door.

8 Claims, 5 Drawing Sheets

AIRCRAFT APPLIANCE FILTER SYSTEM

BACKGROUND

Technological Field

The present disclosure relates to an appliance filter system, and more particularly to an aircraft appliance having a single-piece fixated front panel.

Description of Related Art

Today's commercial aircraft employ a wide variety of appliances. These appliances range from ovens for cooking and warming food to chillers to cooling down drinks and water. The appliances typically have a front access door and a control panel placed above the access door. Typically, appliances have employed removable control panels which allowed access to appliance insides including filter compartments allowing a user to easily access and service the filters. However, some modern appliances employ a control interface that may not be removable, and can take up the entire width of the appliances leaving a user no way to easily access and service the filters. Accordingly, there is a need in the art for an appliance having improved filter access and improved ease of service. There also remains a need in the art for such a system and components that are economically viable. The present disclosure may provide a solution for at least one of these remaining challenges.

SUMMARY OF THE INVENTION

An appliance is disclosed including a door configured to enclose a cooking or chilling space, a filter slot positioned above the door configured to accept a filter for filtering particles, and a control panel for controlling the appliance positioned above the door. The filter slot can be directed along a diagonal axis with respect to a vertical position defined by a vertical axis of the appliance. The control panel can include, user interface integrated into the front panel, which can also include a touch screen. The control panel can include a width equal to or greater than a majority of an appliance width. An air inlet can be adjacent to the user interface.

The filter slot can be positioned below the control panel, wherein the filter is inserted at an upward angle. The filter slot can define a straight line from an opening slot to an inner terminus. The filter slot can include a guide rail configured to support the filter. The filter slot can define a curve along a path from the opening slot to an inner terminus. The opening slot can extend along a vertical axis along an edge of the front panel. The filter slot can include a latch configured to lock a filter in place.

A filter cartridge can be included in order to retain a filter. The cartridge can be configured to rotate and discharge a filter section into the filter slot. As the filter is used up or discharged, the excess or expended filter material can be disposed. It is also considered that a dual cartridge system can be used, where one roll unwinds the new filter material and another roll collects the expended filter material.

The appliance can be an oven or a refrigerator. A stand-alone filter assembly for use with the oven or refrigerators also disclosed. The filter can include a first cover, a filter insert placed on top of the first cover, and a second cover configured to lockably couple to the first cover and lock the filter inset with between the first cover and the second cover. The filter insert can includes a cloth material. The filter can include a filter cassette coupled to at least one of the covers in order to o retain multiple filter inserts detachably coupled to each other.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION

Figure 1:
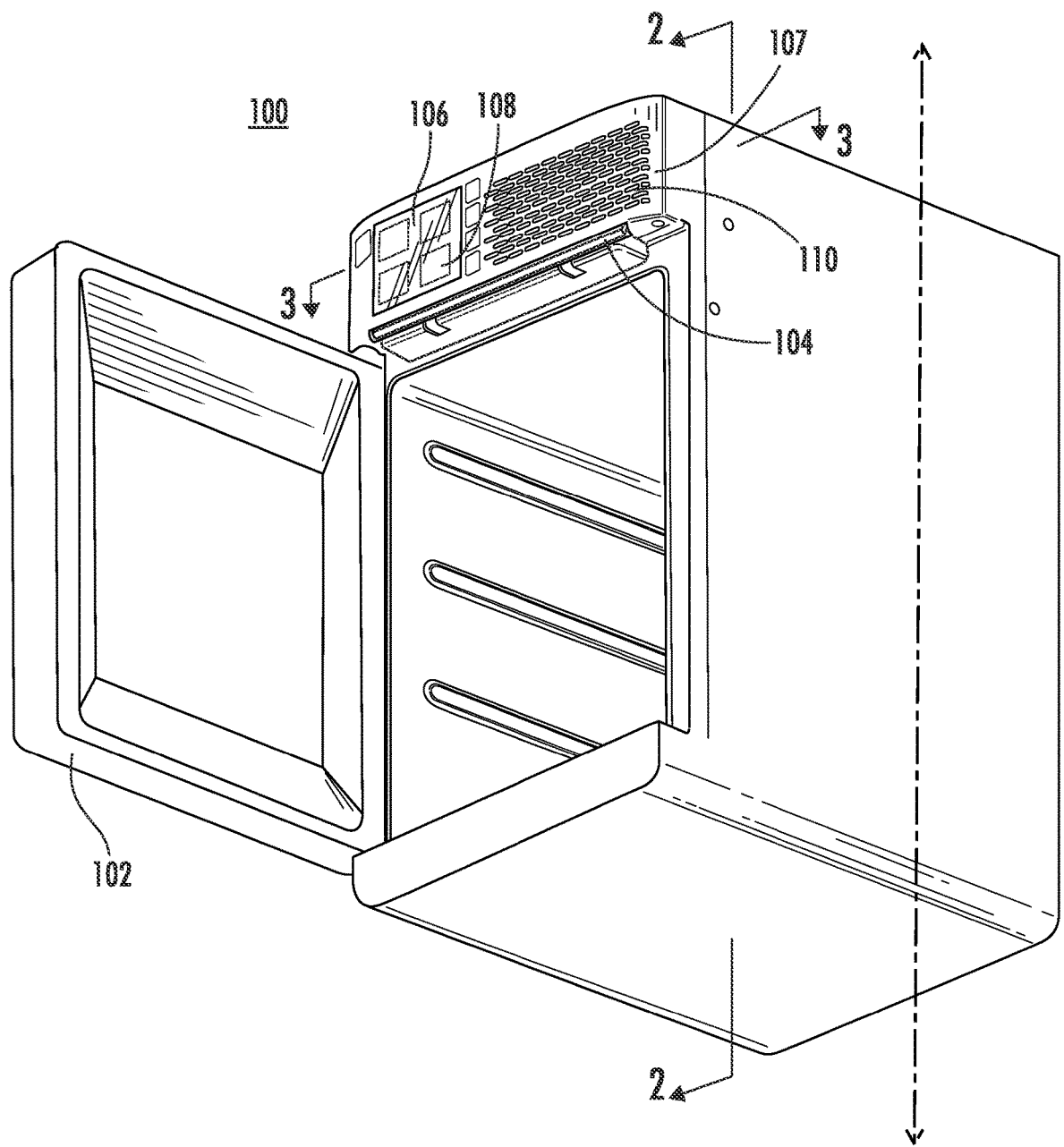
FIG. 1 shows a perspective view of an appliance for use in an aircraft galley system according an embodiment of the disclosure.

Reference will now be made to the drawings wherein like reference numerals identify similar structural features or aspects of the subject invention. For purposes of explanation and illustration, and not limitation, a partial view of an exemplary embodiment of a filter system in accordance with the invention is shown in FIG. 1 and is designated generally by reference character 100. Other embodiments of the system in accordance with the invention, or aspects thereof, are provided in FIGS. 2-5, as will be described. The methods and systems of the invention can be used to provide a filter system to appliances with a non-removable front panel.

FIG. 1 shows a perspective view of an appliance 100 for use in an aircraft galley system. The appliance is considered to be an oven, a chiller, or similar. The appliance 100 includes a door 102 configured to enclose a cooking or chilling space, a filter slot 104 positioned above the door 102 which accepts a filter for filtering cooking particles. A control panel 106 for controlling the appliance is also positioned above the door 106. The control panel 106 includes, user interface 108 integrated into the front face 107 of the appliance, which can also include a touch screen. The control panel 106 can include a width equal to or greater than a majority of an appliance width. An air inlet 110 can be adjacent to the user interface.

Figure 2:
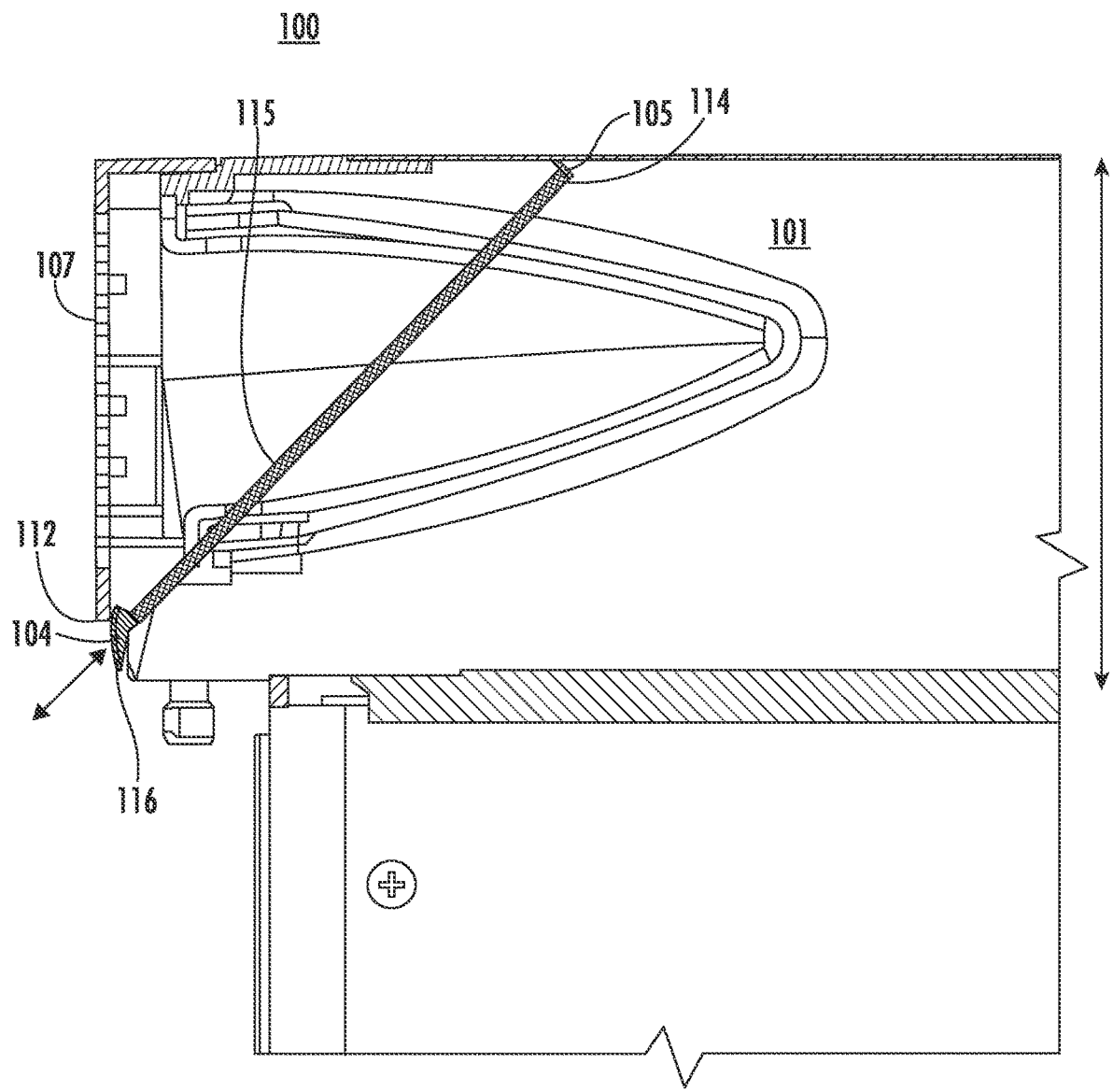
FIG. 2 shows a side cut-away view of the appliance of FIG. 1 showing an inside of the appliance and the filter slot.

FIG. 2 shows a cut-away view of the appliance 100 showing an area 101 inside of the appliance behind the face 107 and the filter slot 104. The filter slot 104 is directed along a diagonal axis 105 with respect to a vertical a vertical axis 108 of the appliance 100. The angled insertion of the filter allows to increase the effective filter surface without having to extend the filter too much further. The filter slot 104 is positioned below the control panel 106 forcing the filter to be inserted at an upward angle (a) with respect to the horizontal. The filter slot 104 can define a straight line from an opening slot 112 to an inner terminus 114. The filter slot 104 includes a guide rail 115 to support and guide the filter along the slot. The filter slot 104 can include a latch 116 to lock a filter in place at the opening slot 112.

Figure 3:
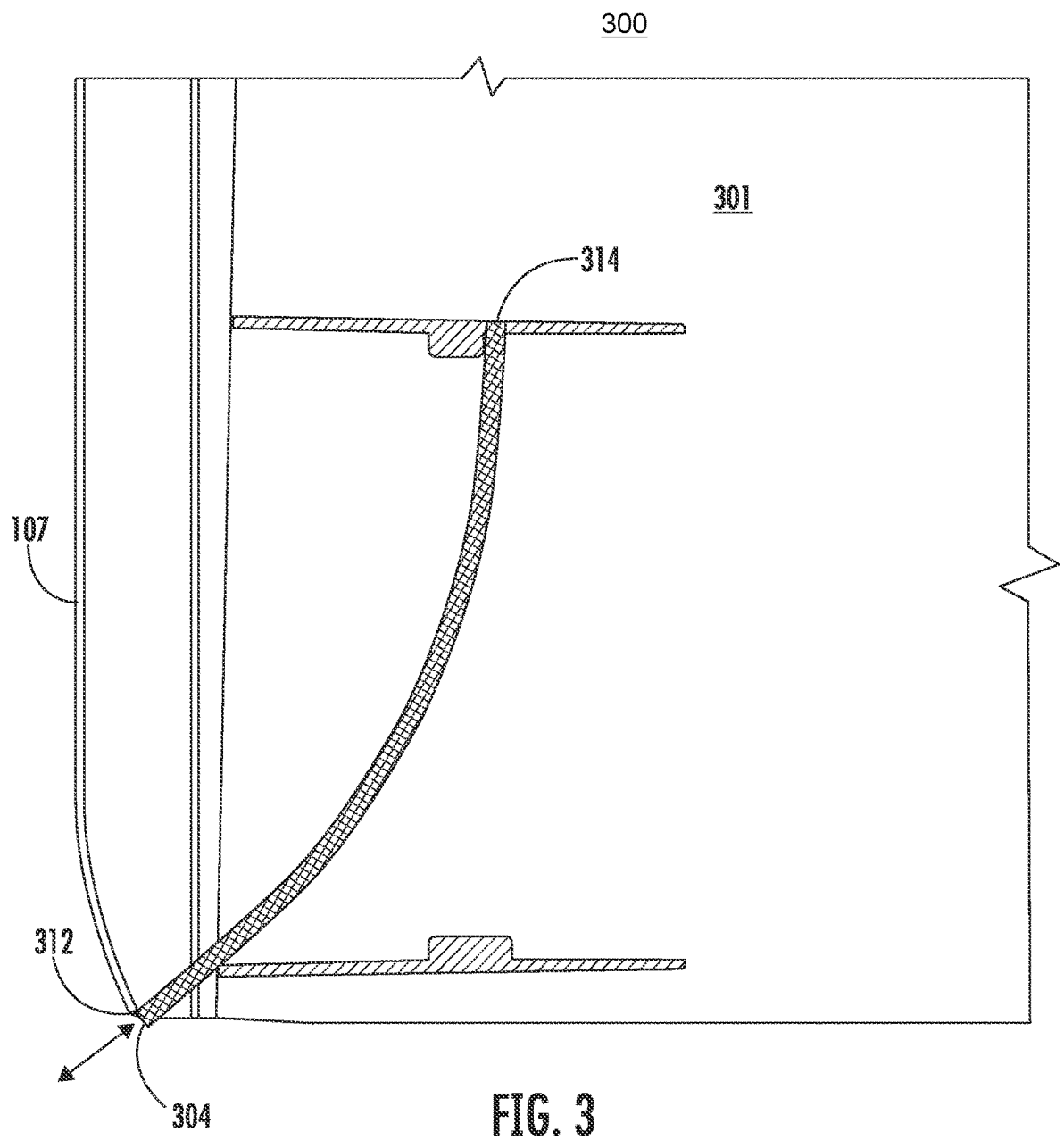
FIG. 3 shows a top cut-away view of the appliance of FIG. 1, showing an alternate filter slot.

FIG. 3 shows a top down cut-away view of the appliance 300 showing an area 301 inside of the appliance behind the face 107. The filter slot 304 defines a curve along a path from the opening slot 312 to an inner terminus 314. In FIG. 3, the opening slot 312 extends along a vertical axis along an edge of the face 107. It is considered that both configurations shown can include a curved or straight filter slot.

Figure 4:
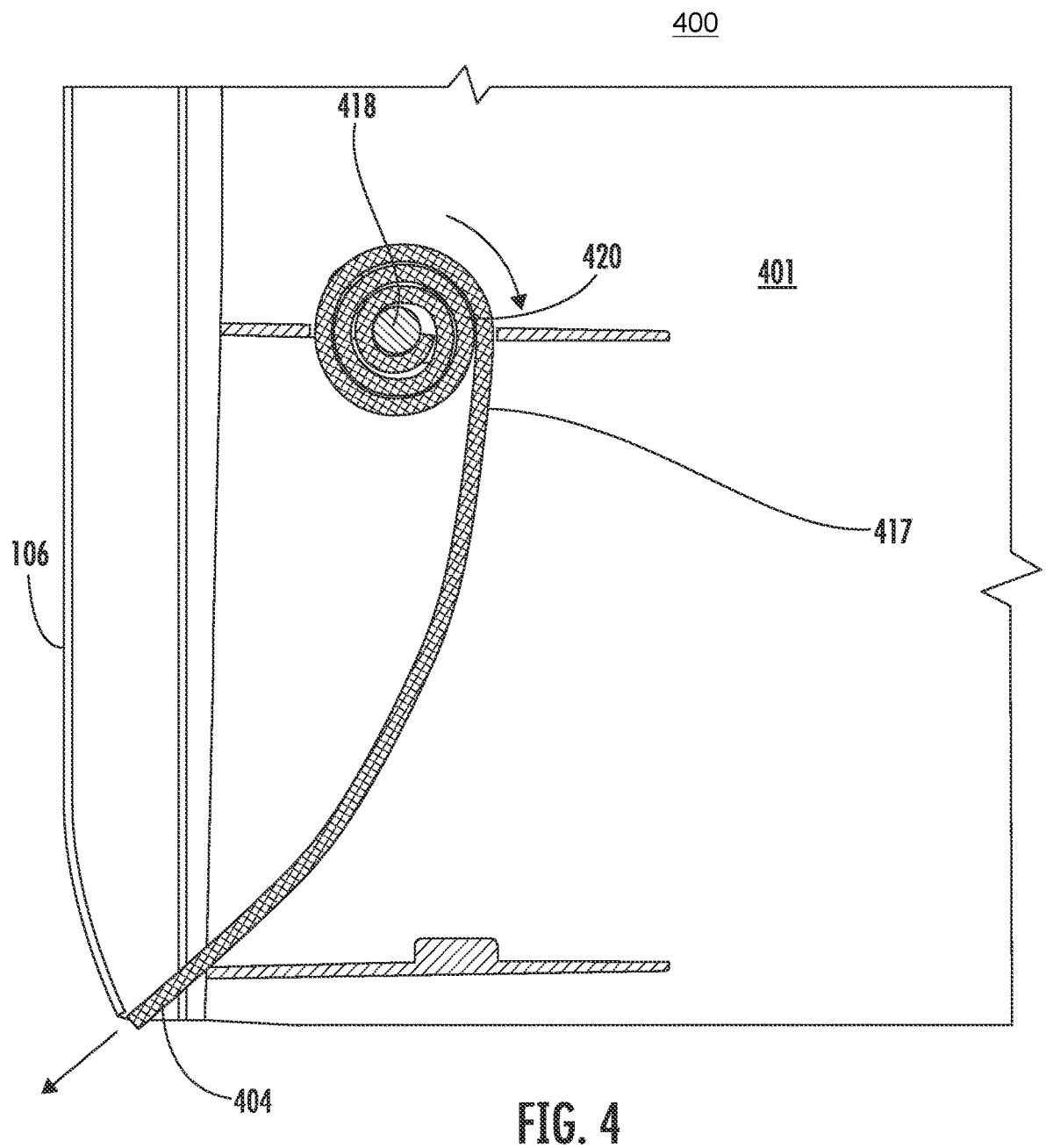
FIG. 4 shows a top cut-away view of the appliance of FIG. 1, showing an alternate filter configuration.

FIG. 4 shows a top-down cut-away view of the appliance 400 showing an area inside of the appliance behind the from face 107 and the filter slot 404. In this embodiment the filter slot 404 leads to a filter cartridge 418. The cartridge includes a drum 420 having a preloaded plurality of filters. Each of the filters are attached to each other, possibly by a perforated connection 417 in a roll configuration. A user can pull on the filter, causing the drum to rotate in order to change the filter and service the appliance 400. This configuration allows for a less invasive and less frequent service of the filter system. It is also considered that a dual cartridge system can be employed where as a first roll unwinds new filter material a second roll collects the expended filter material.

Figure 5:
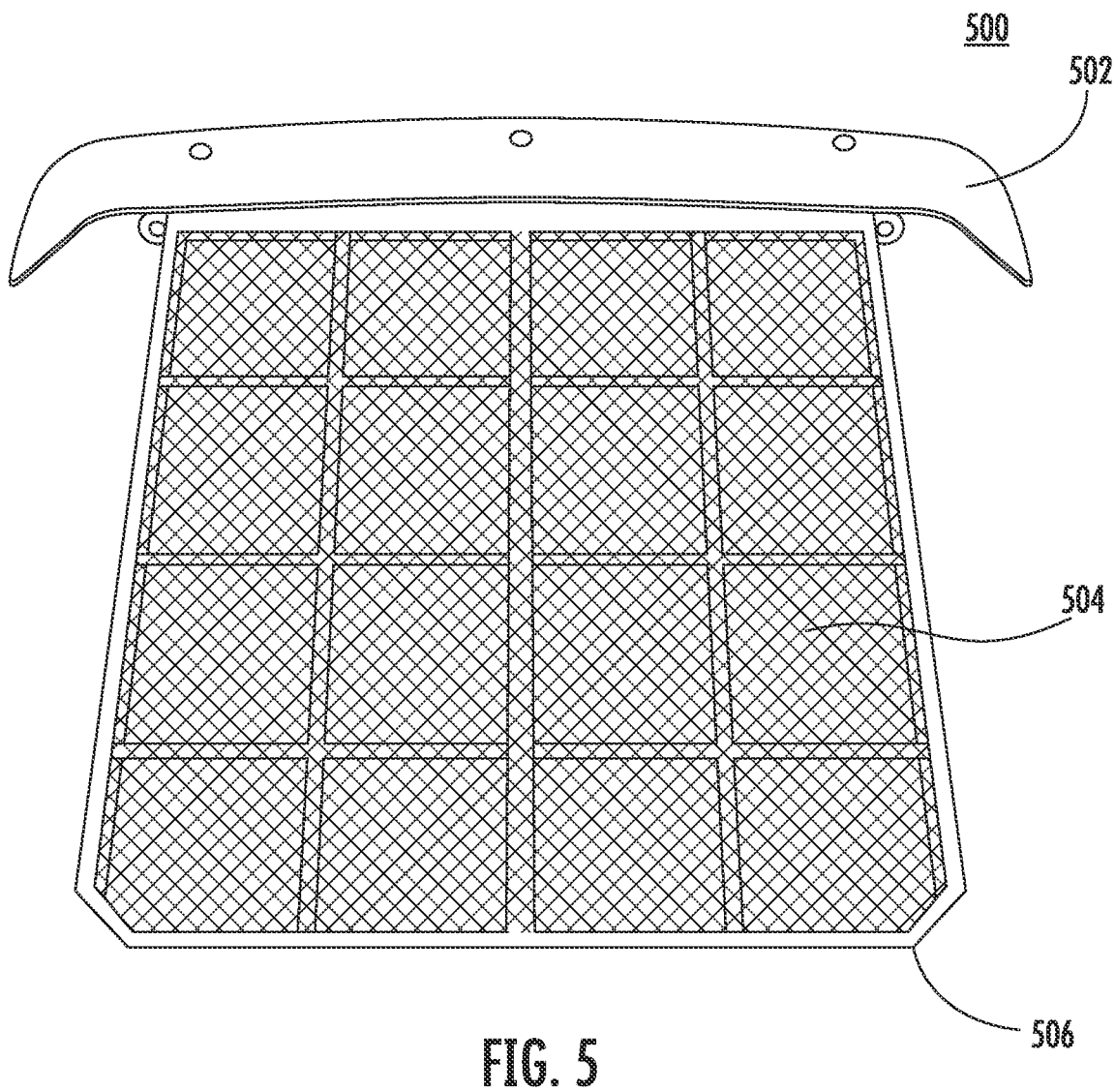
FIG. 5 shows a perspective view of a filter to be used in an appliance of FIG. 1.

FIG. 5 shows a standalone filter assembly 500 for use with the oven or refrigerator is disclosed. The filter assembly 500 includes a first cover 502, a filter insert 504 placed on top of the first cover 502, and a second cover configured 506 to lockably couple to the first cover 502 and lock the filter inset 504. The filter insert 504 can includes a cloth material, as can the filters of the previous embodiments.

The methods and systems of the present disclosure, as described above and shown in the drawings, provide for an aircraft appliance filter system with superior properties including increased reliability and stability, and reduced size, weight, complexity, and/or cost. While the apparatus and methods of the subject disclosure have been showing and described with reference to embodiments, those skilled in the art will readily appreciate that changes and/or modifications may be made thereto without departing from the spirit and score of the subject disclosure.

What is claimed is:

1. An appliance comprising:
   a door configured to enclose a cooking or chilling space;
   a filter slot positioned above the door configured to accept a filter for filtering particles; and
   a control panel for controlling the appliance positioned above the door, wherein the filter slot defines a curve along a path from an opening slot to an inner terminus.

2. The appliance of claim 1, wherein the control panel includes a user interface integrated into the control panel, and an air inlet next to the user interface.

3. The appliance of claim 1, wherein the control panel includes a width equal to or greater than a majority of an appliance width.

4. The appliance of claim 1, wherein filter slot is positioned below the control panel.

5. The appliance of claim 1, wherein the opening slot is extended along a vertical axis.

6. The appliance of claim 1, wherein the appliance is an oven.

7. The appliance of claim 1, wherein the appliance is a refrigerator.

8. The appliance of claim 1, wherein the appliance is embedded within an aircraft galley.

\* \* \* \* \*